W. BRÜCKNER.
ORE PULVERIZER.
No. 178,266.  Patented June 6, 1876.
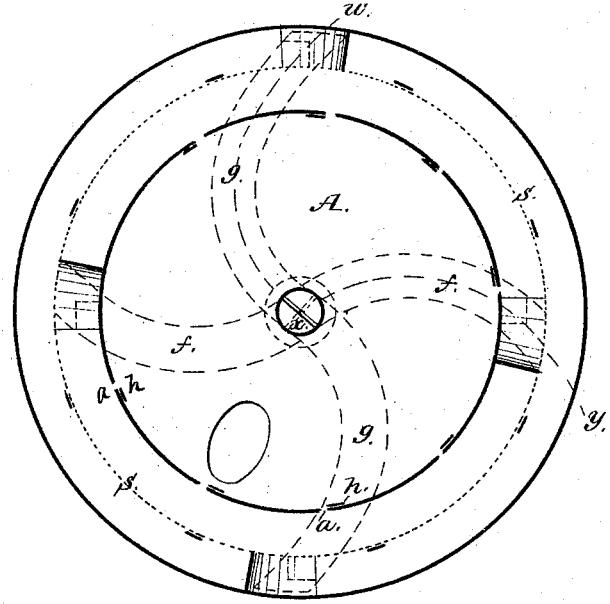
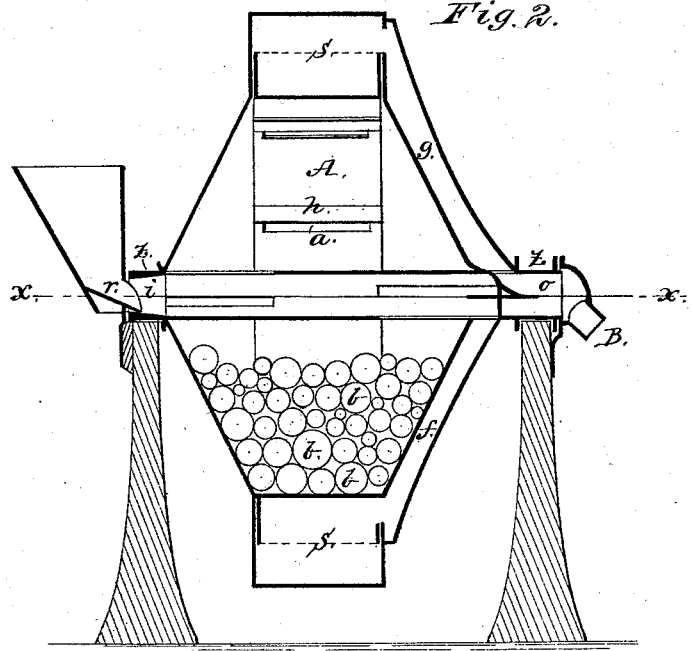
Witnesses:
Hermann Heismann
Berthold Roj
Inventor:
William Brückner

United States Patent Office.

WILLIAM BRÜCKNER, OF ROSSLAU, GERMANY, ASSIGNOR OF ONE-HALF HIS RIGHT TO GOTTFRIED SACHSENBERG, OF SAME PLACE.

IMPROVEMENT IN ORE-PULVERIZERS.

Specification forming part of Letters Patent No. 178,266, dated June 6, 1876; application filed March 4, 1876.

*To all whom it may concern:*

Be it known that I, WILLIAM BRÜCKNER, of Rosslau, Germany, have invented certain Improvements in Apparatus for Pulverizing Ores, cement, gypsum, coal, and other substances, of which the following is a specification:

In the accompanying drawings, Figure I is a side elevation; Fig. II, a longitudinal section through the line $w\ x\ y$.

The nature of my invention consists, first, in providing drum or vessel A with one or more conveyers or passages, $g\ g$, through which the pulverized substances are discharged out of the apparatus in such a manner that these substances, after having been charged at the opening $i$, and after being ground by the action of the balls $b\ b$, and after passing the slots or openings $a\ a$, and after being sifted by the sieve S, are conveyed toward the opening $o$, said opening being located at or near the axis of revolution $x\ x$; second, in connecting these conveyers $g\ g$ with the stationary outlet B, through which outlet the pulverized substances are finally discharged without loss of dust.

By this arrangement the expense of a large casing surrounding the whole apparatus is dispensed with; and, besides, there is the advantage that the pivots $z$ and $z$, on which the drum A is made to revolve, are protected against the destroying action of the dust, and that the apparatus is made of easy access and its operation can be controlled better than when the whole apparatus is inclosed by a casing.

After having thus described the nature of my invention, I will now proceed to describe its construction and operation, in order to enable those skilled in the art to make and use the same.

I make my apparatus of iron or other suitable material, and those parts which are liable to be worn by the action of the balls are protected by plates, ribs, and rails of steel and iron, fastened in such a manner to the inside of the drum that they may easily be replaced when worn out. Especially the slots or openings $a\ a$ are to be protected by the ribs $h\ h$ against the action of the balls.

The shape of the revolving drum may be either cylindrical with cone-shaped heads or cylindrical with flat heads, or any other shape of vessel may be used for providing it with the above-mentioned conveyers or passages $g\ g$ and outlet B.

The passages or conveyers $f\ f$ are made for the purpose of returning into the drum those parts of the substances to be treated which are too coarse to pass the sieve S.

The apparatus is made to revolve either by means of a pulley, or by gearing or otherwise, at a speed of about twenty revolutions per minute.

The operation of my apparatus is as follows: The substances to be treated, after having been reduced to about the size of a hickory-nut by a Blake's crusher or other suitable apparatus are continuously fed into the drum A by the inlet $r$, which is tightly connected with the opening $i$ by means of a ring of felt or otherwise.

The feeding must be done regularly, and in proportion to the grinding action of the balls, and no more must be charged into the drum than can readily be discharged through the openings $a\ a$, the sieve S, and the conveyers $g\ g$. This is easily learned by a little practice with the different substances.

The outlet B is also tightly fitted to the opening $o$ by means of a ring of felt, so that no dust is lost, but all the pulverized substances may be saved by letting them directly from the outlet B into a bag, a car, or a box, as the case may be.

In some cases, whenever sifting is not required, the sieve S and conveyers $f\ f$ may be dispensed with.

I claim as my invention—

1. A revolving vessel, provided with conveyers $g\ g$, for conducting the substances to be treated toward the opening $o$ and the outlet B, said opening and outlet being constructed at or near the revolving axis $x\ x$, substantially in the manner and for the purpose described.

2. The combination, with the drum or vessel A, provided with the sieve S, of the conveyers $f\ f$ and $g\ g$, and the discharge-opening $o$ and the outlet B, substantially in the manner and for the purpose described.

In testimony whereof I have signed my name to this specification in the presence of two subscribing witnesses.

WILLIAM BRÜCKNER.

Witnesses:
BERTHOLD ROI,
HERMANN KREISMANN.